United States Patent
Kao (10) Patent No.: US 11,671,131 B2
(45) Date of Patent: Jun. 6, 2023

(54) TRANSMITTER CIRCUIT, COMPENSATION VALUE CALIBRATION DEVICE AND METHOD FOR CALIBRATING IQ IMBALANCE COMPENSATION VALUES

(71) Applicant: Realtek Semiconductor Corp., HsinChu (TW)

(72) Inventor: Tzu-Ming Kao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 11 days.

(21) Appl. No.: 17/667,516

(22) Filed: Feb. 8, 2022

(65) Prior Publication Data

US 2022/0345164 A1 Oct. 27, 2022

(30) Foreign Application Priority Data

Apr. 23, 2021 (TW) ................. 110114717

(51) Int. Cl.
*H04B 17/00* (2015.01)
*H04B 1/04* (2006.01)
*H04B 17/21* (2015.01)
*H04B 17/11* (2015.01)

(52) U.S. Cl.
CPC ......... *H04B 1/0475* (2013.01); *H04B 1/0483* (2013.01); *H04B 17/11* (2015.01); *H04B 17/21* (2015.01); *H04B 2001/0491* (2013.01)

(58) Field of Classification Search
CPC ........ H04B 1/126; H04B 1/0039; H04B 1/30; H04B 1/04; H04B 2001/0433; H04B 17/101; H04B 17/14; H04B 1/0475; H04B 17/11; H04B 17/21; H04B 1/0483
See application file for complete search history.

(56) References Cited

U.S. PATENT DOCUMENTS

| 8,010,064 B2 * | 8/2011 | Kim ................. H04B 17/14 455/115.2 |
| 9,276,798 B2 * | 3/2016 | Yu ..................... H04L 27/364 |
| 2019/0097866 A1 * | 3/2019 | Sestok, IV ......... H04L 27/3863 |

* cited by examiner

*Primary Examiner* — Tuan Pham
(74) *Attorney, Agent, or Firm* — Winston Hsu (57) ABSTRACT

A transmitter circuit includes at least one transmitting signal processing device, a compensation device and a compensation value calibration device. The at least one transmitting signal processing device sequentially generates multiple output signals according to multiple input signals. The compensation device sequentially generates the input signals according to multiple initial compensation values. The compensation value calibration device receives the output signals as multiple feedback signals and performs a calibration operation according to the feedback signals. The compensation value calibration device includes a digital signal processor coupled to the compensation device. In the calibration operation, the digital signal processor determines a first characteristic curve according to the initial compensation values and power of the feedback signals at a predetermined frequency, determines a first compensation value corresponding the minimum power according to the first characteristic curve and provides the first compensation value to the compensation device.

15 Claims, 5 Drawing Sheets

TRANSMITTER CIRCUIT, COMPENSATION VALUE CALIBRATION DEVICE AND METHOD FOR CALIBRATING IQ IMBALANCE COMPENSATION VALUES

BACKGROUND OF THE INVENTION

1. Field of the Invention

The invention relates to a method for calibrating In-phase and Quadrature-phase (IQ) imbalance compensation values and a transmitter circuit utilizing the method.

2. Description of the Prior Art

There is a performance limitation of IQ imbalance in the design of a Zero Intermediate Frequency (Zero-IF) transmitter or zero-IF receiver because only one mixing stage is utilized to directly convert the baseband signal to radio frequency signal or only one mixing stage is utilized to directly convert the received RF signal to the baseband signal. The reason of causing the IQ imbalance is that when there is some difference in the in-phase channel response and the quadrature-phase channel response, the two signals passing through the in-phase channel and the quadrature-phase channel will have unequal amplitude or phase gain.

To solve the problem of IQ imbalance in the Zero-IF transmitter or zero-IF receiver, a method for effectively calibrating IQ imbalance compensation values is highly required.

SUMMARY OF THE INVENTION

It is an objective of the invention to solve the problem of IQ imbalance in the Zero-IF transmitter or zero-IF receiver by effectively calibrating IQ imbalance compensation values.

According to an embodiment of the invention, a transmitter circuit comprises at least one transmitting signal processing device, a compensation device and a compensation value calibration device. The at least one transmitting signal processing device is configured to sequentially generate a plurality of output signals according to a plurality of input signals. The compensation device is configured to sequentially generate the input signals according to a plurality of initial compensation values. The compensation value calibration device is coupled to an output terminal of the at least one transmitting signal processing device and configured to sequentially receive the output signals from the output terminal as a plurality of feedback signals and perform a calibration operation according to the feedback signals. The compensation value calibration device comprises a digital signal processor coupled to the compensation device. In the calibration operation, the digital signal processor is configured to determine a first characteristic curve according to the initial compensation values and power of the feedback signals at a predetermined frequency, determine a first compensation value corresponding to a minimum power in the first characteristic curve according to the first characteristic curve and provide the first compensation value to the compensation device.

According to another embodiment of the invention, a compensation value calibration device for calibrating one or more compensation values utilized by a compensation device of a transmitter comprises a Fast Fourier Transform (FFT) device and a digital signal processor. The FFT device, configured to perform FFT on a plurality of feedback signals received from the transmitter. The feedback signals correspond to a plurality of initial compensation values. The digital signal processor is coupled to the FFT device and the compensation device and, in a calibration operation, is configured to determine a first characteristic curve according to the initial compensation values and power of the feedback signals at a predetermined frequency, determine a first compensation value corresponding to a minimum power in the first characteristic curve according to the first characteristic curve and provide the first compensation value and a plurality of first reference compensation values to the compensation device. After receiving the feedback signals corresponding to the first compensation value and the first reference compensation values from the transmitter, the digital signal processor is further configured to determine a second characteristic curve according to the first reference compensation values and power of the feedback signals at the predetermined frequency, determine a second compensation value corresponding to a minimum power in the second characteristic curve according to the second characteristic curve and provide the second compensation value to the compensation device.

According to yet another embodiment of the invention, a method for calibrating IQ imbalance compensation values, comprising following steps: (A) obtaining a plurality of output signals generated by a transmitter according to a test signal and a plurality of compensation values as a plurality of feedback signals; (B) determining a characteristic curve according to the compensation values and power of the feedback signals at a predetermined frequency and determining a compensation value corresponding to a minimum power according to the characteristic curve; and (C) generating the plurality of compensation values according to the compensation value determined in step (B), providing the plurality of compensation values to the transmitter and re-performing step (A) and step (B). Step (C) is repeatedly performed until a predetermined condition corresponding to the minimum power is satisfied.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
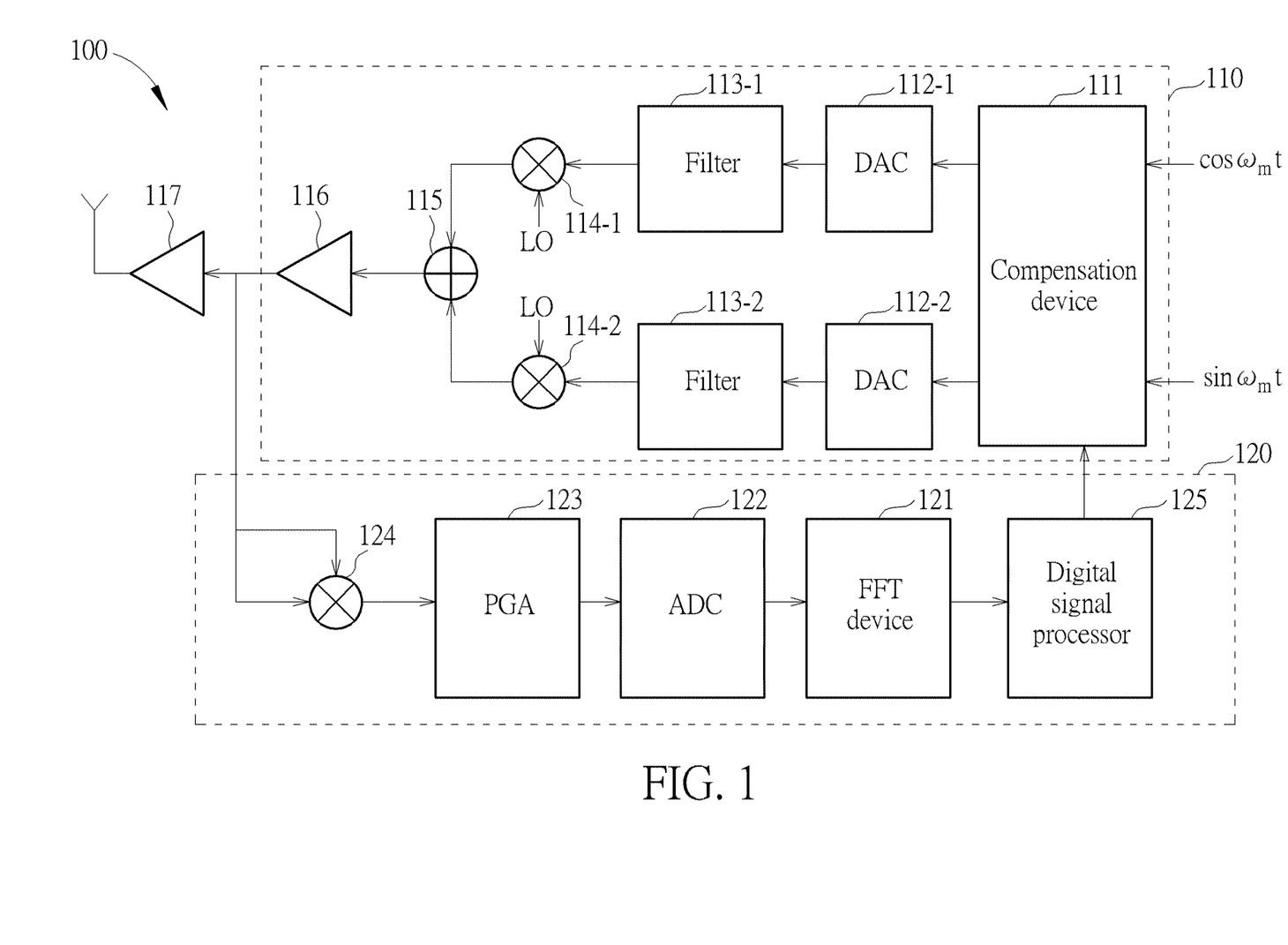
FIG. 1 shows an exemplary transmitter circuit according to an embodiment of the invention

FIG. 1 shows an exemplary transmitter circuit according to an embodiment of the invention. The transmitter circuit 100 may comprise a transmitting signal processing path 110 and a feedback signal processing path 120. The transmitting signal processing path 110 may comprise a plurality of stages of transmitting signal processing devices configured to process the transmitting signal, as an example, converting baseband signal to radio frequency signal. According to an embodiment of the invention, the transmitting signal processing path 110 may comprise a compensation device 111, Digital to Analog Converter (DAC) 112-1 and DAC 112-2, filter 113-1 and filter 113-2 and mixer 114-1 and mixer 114-2 respectively on the in-phase channel and the quadrature-phase channel, an adder 115 and a buffer circuit 116. The compensation device 111 is configured to receive a test signal or an original input signal, perform compensation for IQ imbalance on the received signal according to an IQ compensation value to generate a compensated input signal. The IQ compensation value may be amplitude compensation value or phase compensation value utilized for compensating for the amplitude or the phase of the signals on the in-phase channel and the quadrature-phase channel. For example, the compensation device 111 may adjust the amplitude and phase of the received signal according to the IQ compensation value, so as to eliminate the IQ imbalance on the transmitting signal processing path.

The DAC 112-1 and the DAC 112-2 are respectively configured to convert a plurality of input signals that have been compensated from digital domain to analog domain on the in-phase channel and the quadrature-phase channel. The filter 113-1 and filter 113-2 are respectively configured to perform filtering on the received signals. The mixer 114-1 and mixer 114-2 are respectively configured to multiply the received signals with an oscillating signal LO to convert the received signal from baseband to radio frequency signal. The oscillating signals LO provided to the mixer 114-1 and mixer 114-2 are two signals having the same frequency with quadrature in phase. The adder 115 is configured to combine the signals on the in-phase channel and the quadrature-phase channel. The buffer circuit 116 may be a driving circuit of the power amplifier 117 to buffer the received radio frequency signal and drive the power amplifier 117 in the subsequent stage. The power amplifier 117 is configured to amplify the radio frequency signal before it is sent out through the antenna.

In the embodiments of the invention, the feedback signal processing path 120 may comprise a plurality of feedback signal processing devices, such as a mixer 124, a Programmable Gain Amplifier (PGA) 123, an Analog to Digital Converter (ADC) 122, a Fast Fourier Transform (FFT) device 121 and a digital signal processor 125. The feedback signal processing path 120 may be coupled to an output terminal of at least one transmitting signal processing device, for example, an output terminal of the buffer circuit 116, to receive an output signal generated by the transmitting signal processing device from the output terminal as a feedback signal and process the feedback signal. The mixer 124 is configured to multiply the received feedback signal with itself to down convert the feedback signal to the baseband signal. Here, the output signal is the signal that has been processed by the aforementioned transmitting signal processing device, and the signal processing includes the signal processing performed on the in-phase channel and the quadrature-phase channel. The PGA 123 is configured to amplify (or, attenuate) the received feedback signal. The ADC 122 is configured to convert the feedback signal from analog domain to digital domain. The FFT 121 is configured to perform FFT on the received feedback signal, so as to generate the feedback signal in frequency domain. The digital signal processor 125 is coupled to the FFT 121 and the compensation device 111 and is configured to perform a calibration operation according to the feedback signal in frequency domain to calibrate one or more compensation values utilized by the compensation device 111.

In an embodiment of the invention, the power amplifier 117, the antenna and the devices on the transmitting signal processing path 110 may be as a whole regarded as a transmitter, and one or more devices on the feedback signal processing path 120 may be as a whole regarded as a compensation value calibration device to assist the execution of the calibration operation and to calibrate one or more compensation values used by the compensation device 111 of the transmitter.

According to an embodiment of the invention, the calibration operation may comprise one or more iterative operations. At the beginning of the calibration operation, the digital signal processor 125 may set a plurality of initial compensation values used by the compensation device 111, and provide a test signal to a receiving terminal of the transmitter, as an example, the receiving terminal of the compensation device 111. The digital signal processor 125 may slightly increase or decrease an initial compensation value to generate the aforementioned plurality of different initial compensation values. For example, the initial compensation value may be set to 0 and the digital signal processor 125 may slightly increase and slightly decrease the initial compensation value to generate the plurality of initial compensation values −1, 0 and 1. The test signal provided to the transmitter may be a single tone signal comprising or combining an in-phase component and a quadrature-phase component, or may be two signals having the same frequency and quadrature in phase, for example, a pair of cosine signal $\cos \omega_m t$ and sine signal $\sin \omega_m t$ with angular frequency $\omega_m$. It is to be noted that which device generates or provides the test signal is not a limit in the invention. For example, the test signal may also be provided by another signal generating device (not shown in FIG. 1).

In addition, it is to be noted that the aforementioned compensation values may be amplitude compensation values or phase compensation values. As an example, the initial compensation value may be a set of compensation values comprising an initial amplitude compensation value and an initial phase compensation value. The digital signal processor 125 may respectively slightly increase or decrease the initial amplitude compensation value and the initial phase compensation value to generate another two sets of compensation values. For simplicity, the amplitude compensation value and phase compensation value are not deliberately distinguished in the following paragraphs. In the following paragraphs, the term "compensation value" may represent a set of compensation values comprising an amplitude compensation value and a phase compensation value (or, may represent one of the amplitude compensation value and the phase compensation value), and the term "different compensation values" may represent different sets of compensation values (or, may represent different amplitude compensation values or different phase compensation values).

Figure 2:
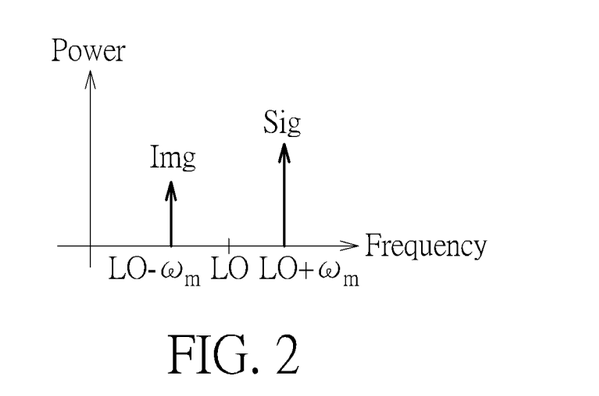
FIG. 2 shows an exemplary frequency spectrum of an RF signal.

FIG. 2 shows an exemplary frequency spectrum of an RF signal. The RF signal may be the RF signal output from the output terminal of the buffer circuit 116. As can be seen from FIG. 2, it is assumed that the original signal Sig is a single tone signal with angular frequency $\omega_m$. Due to the IQ imbalance in the transmitting signal processing path, the spectrum of the generated RF signal contains not only the power of the original signal Sig at frequency (Lo+$\omega_m$), but also the power of the unwanted image signal Img at frequency (Lo-$\omega_m$).

Figure 3:
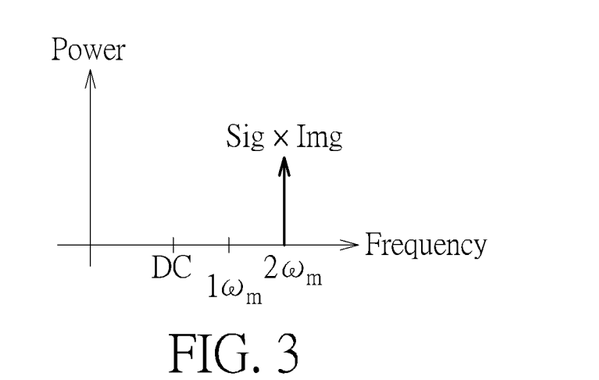
FIG. 3 shows an exemplary frequency spectrum of a feedback signal.

FIG. 3 shows an exemplary frequency spectrum of a feedback signal. It can be seen from this example that due to the existence of the image signal Img, the signal Sig*Img generated after the feedback signal is processed by the mixer 124 has some power that cannot be ignored at a predetermined frequency. According to an embodiment of the invention, the predetermined frequency may be twice the input frequency of the input signals. For example, when the angular frequency of the test signal is $\omega_m$, the predetermined frequency is twice the angular frequency $2\omega_m$. It is to be noted that the predetermined frequency may vary with the design of the mixer 124. As an example, when the mixer 124 is designed to multiply the feedback signal with a signal having another frequency different from $\omega_m$, the predetermined frequency is adjusted to another value obtained by adding the input frequency and said another frequency or obtained by subtracting said another frequency from the input frequency.

In the calibration operation, for example, in the first iteration, the compensation device 111 is configured to sequentially perform compensation on the amplitude and/or phase of the test signal based on different compensation values, to sequentially generate a plurality of compensated signal as the input signals of a subsequent stage. The subsequent devices on the transmission signal processing path 110 sequentially perform corresponding processing on the received input signal (for example, the signal processing described in the previous paragraphs, comprising the signal processing respectively performed on the in-phase channel and the quadrature-phase channel) to generate a plurality of output signals corresponding to different compensation values. The compensation value calibration device is coupled to an output terminal of at least one transmitting signal processing device to sequentially receive the output signals corresponding to different compensation values from the output terminal as a plurality of feedback signals and sequentially perform corresponding processing on feedback signals (for example, the signal processing described in the previous paragraphs). After performing the signal processing, the digital signal processor 125 may obtain information regarding the power of the feedback signals at the predetermined frequency according to the plurality of frequency domain feedback signals generated by the FFT device 121 and determine a characteristic curve according to the obtained power information of the feedback signals and the corresponding compensation values. For example, in the first iteration, the digital signal processor 125 may obtain a first characteristic curve.

Figure 4:
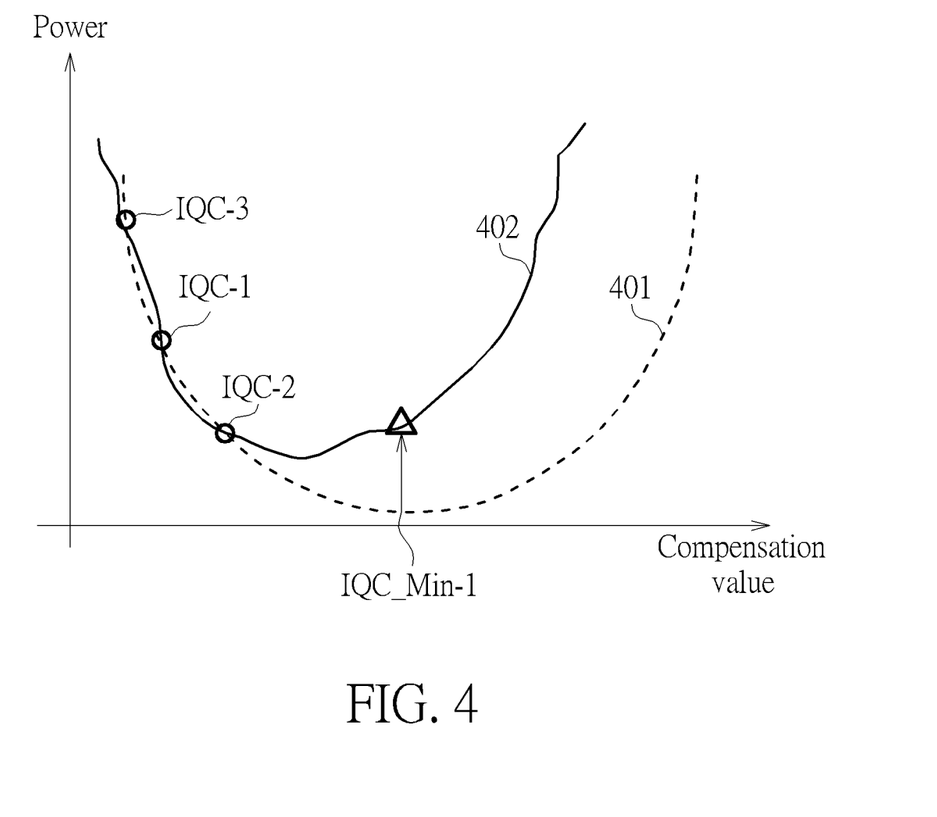
FIG. 4 shows an exemplary characteristic curve determined based on the power of the feedback signal at the predetermined frequency and the corresponding compensation values according to an embodiment of the invention.

FIG. 4 shows an exemplary characteristic curve determined based on the power of the feedback signal at the predetermined frequency and the corresponding compensation values according to an embodiment of the invention, where the compensation values on the X-axis is one of the amplitude compensation values and the phase compensation values and the Y-axis is the power of the frequency component of the feedback signal at the predetermined frequency. It is to be noted that although FIG. 4 shows a 2D curve, the invention is not limited thereto. In the embodiments of the invention, the characteristic curve determined by the digital signal processor 125 according to the feedback signals and the corresponding compensation values may be a 3D curve, where the X-axis may be the amplitude compensation value, the Z-axis may be the phase compensation value and the Y-axis may be the power of the frequency component at the predetermined frequency.

The compensation value IQC-1 in FIG. 4 may be (as an example but not limited to) the above-mentioned initial value which is set to 0, the compensation values IQC-2 and IQC-3 may be another two compensation values generated by adjusting the compensation value IQC-1. The digital signal processor 125 may determine the characteristic curve 401 according to the compensation values IQC-1, IQC-2 and IQC-3 and the power of the frequency component at the predetermined frequency of the feedback signals obtained by applying these compensation values, find out the compensation value corresponding to the minimum power of the characteristic curve and provide the obtained compensation value to the compensation device 111.

According to an embodiment of the invention, the digital signal processor 125 may determine the characteristic curve 401 which describes the relationship between the compensation values and the power of the feedback signal based on the compensation values IQC-1, IQC-2, and IQC-3 and corresponding power by using curve fitting or least squares method. For example, the digital signal processor 125 may determine the mathematic function of the characteristic curve 401 and determine a compensation value corresponding to the minimum power according to the mathematic function of the characteristic curve 401. As an example, in the first iteration, the digital signal processor 125 may determine the first compensation value IQC_Min−1. In the embodiments of the invention, the mathematic function of a characteristic curve may be a Quadratic function, a Quartic function, or any function having a minimum value (that is, the parabola having an upward opening).

Figure 5:
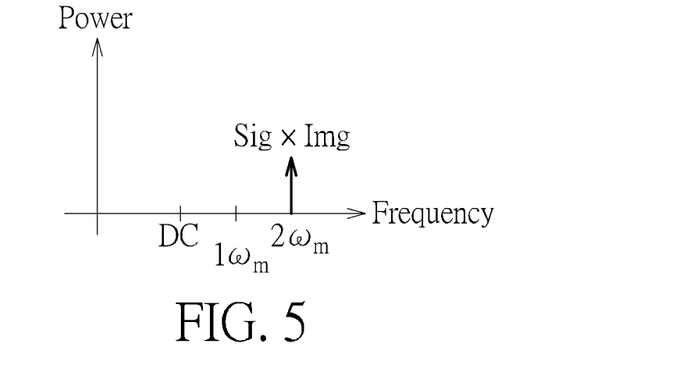
FIG. 5 shows another exemplary frequency spectrum of a feedback signal.

FIG. 5 shows another exemplary frequency spectrum of a feedback signal. This exemplary frequency spectrum is the frequency spectrum of a feedback signal obtained after applying the first compensation value. As shown in FIG. 5, since the operation of the first iteration is to try to find out the compensation value corresponding to the minimum power, the power of the signal Sig*Img at the predetermined frequency has been significantly reduced.

Assuming that the curve that can accurately describe the relationship between the compensation values and the power is the characteristic curve 402, since the first compensation value IQC_Min−1 may not precisely correspond to the minimum value of the characteristic curve 402 as pointed out by the triangle sign shown in FIG. 4, the digital signal processor 125 may determine whether a second iteration of the calibration operation has to be performed or whether the calibration operation is to be ended. According to an embodiment of the invention, the digital signal processor 125 may determine whether the second iteration of the calibration operation has to be performed by determining whether a predetermined number of iterations is achieved or whether the minimum power obtained in this iteration satisfies a predetermined condition (for example, smaller than a threshold value).

When the digital signal processor 125 determines that the second iteration of the calibration operation has to be performed, the digital signal processor 125 may provide a plurality of reference compensation values, such as a plurality of first reference compensation values, to the compensation device 111, where the reference compensation values may be utilized in a current or next iteration to adjust the compensation value obtained in the previous iteration. As an example, in the second iteration, the compensation device 111 may use the first reference compensation values to fine tune the first compensation value, so as to generate a plurality of compensation values to be utilized in the second iteration. It is to be noted that the plurality of compensation values to be utilized in a next iteration is not limited to be generated by the compensation device 111. In other embodiments of the invention, the plurality of compensation values to be utilized in a next iteration may also be generated by the digital signal processor 125 according to a plurality of reference compensation values and the latest obtained compensation value. In addition, in the embodiments of the invention, the same set of reference compensation values may be utilized in different iterations, and different sets of reference compensation values may also be utilized in different iterations. For example, in the calibration operation, the reference compensation values utilized in an iteration may be smaller than the reference compensation values used a previous iteration.

In the second iteration of the calibration operation, the compensation device 111 may also sequentially perform compensation on the amplitude and/or phase of the test signal based on different compensation values to sequentially generate a plurality of compensated signal as the input signals of a next stage. The subsequent devices on the transmitting signal processing path 110 sequentially perform corresponding processing on the received input signal to generate a plurality of output signals. After the signal processing on the transmitting signal processing path 110, the compensation value calibration device sequentially receives the output signals corresponding to different compensation values as a plurality of feedback signals and sequentially performs corresponding processing on the feedback signals. After performing the signal processing on the feedback signals, the digital signal processor 125 may obtain information regarding the power of the feedback signals at the predetermined frequency according to the plurality of frequency domain feedback signals generated by the FFT device 121, determine a second characteristic curve according to the obtained information regarding power of the feedback signals and the corresponding compensation values (for example, the aforementioned first reference compensation values), determine the compensation value (for example, the second compensation value) corresponding to the minimum power of the second characteristic curve and provide the second compensation value to the compensation device 111. The methods for determining the characteristic curve and methods for determining the compensation value corresponding to the minimum power of the characteristic curve may refer to the previous paragraphs, and are omitted here for brevity.

Figure 6:
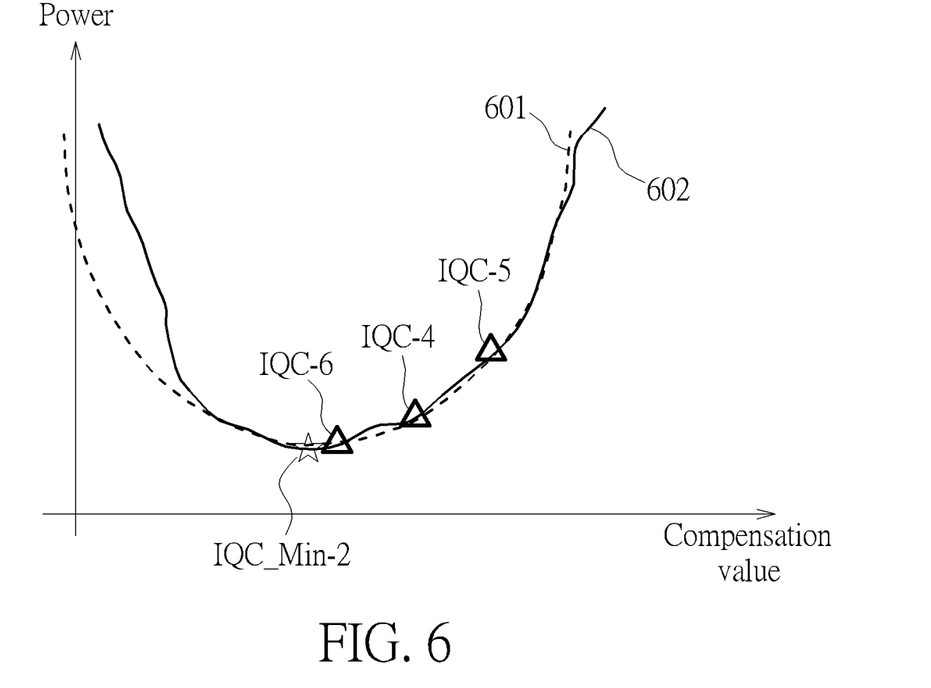
FIG. 6 shows another exemplary characteristic curve determined based on the power of the feedback signal at the predetermined frequency and the corresponding compensation values according to an embodiment of the invention.

FIG. 6 shows another exemplary characteristic curve determined based on the power of the feedback signal at the predetermined frequency and the corresponding compensation values according to an embodiment of the invention, where the compensation values on the X-axis is one of the amplitude compensation values and the phase compensation values and the Y-axis is the power of the frequency component of the feedback signal at the predetermined frequency. The compensation values IQC-4, IQC-5, and IQC-6 may be (but not limited to) the plurality of first reference compensation values utilized in the second iteration. Assuming that the curve that can accurately describe the relationship between the compensation values and the power is the characteristic curve 602 and the digital signal processor 125 determines the characteristic curve 601 based on the compensation values IQC-4, IQC-5 and IQC-6 and the power of the frequency component at the predetermined frequency of the feedback signal obtained by applying these compensation values, finds out the compensation value IQC_Min−2 as pointed out by the star sign shown in FIG. 6 corresponding to the minimum power of the characteristic curve and provide the obtained compensation value to the compensation device 111.

Similarly, after determining the compensation value corresponding to the minimum power of the characteristic curve, the digital signal processor 125 may determine whether a next iteration of the calibration operation is required or whether the calibration operation is to be ended. When the digital signal processor 125 determines that the calibration operation is to be ended, the digital signal processor 125 does not update the compensation value provided to the compensation device 111 and makes the compensation device 111 not to receive the test signal. The digital signal processor 125 may also control the other devices on the feedback signal processing path to stop operation. After the calibration operation is ended, the compensation device 111 may receive a normal input signal as the original input signal and compensate for the IQ imbalance on the received signal according to the latest obtained compensation value to generate the compensated input signal.

Figure 7:
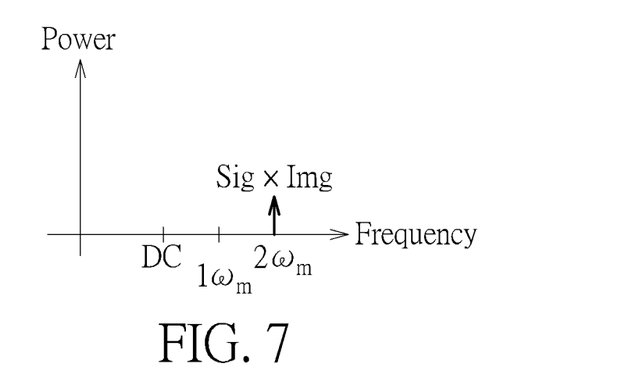
FIG. 7 shows yet another exemplary frequency spectrum of a feedback signal.

FIG. 7 shows yet another exemplary frequency spectrum of a feedback signal. This exemplary frequency spectrum is the frequency spectrum of a feedback signal obtained by applying the second compensation value. It can be seen from this example that, as compared to FIG. 5, after two iterations in the calibration operation, the power of the signal Sig*Img at the predetermined frequency has been further reduced.

According to an embodiment of the invention, if more than one iteration has been performed in the calibration operation, the digital signal processor 125 or the compensation device 111 may add up all the compensation values obtained in the previously performed iteration to obtain a summation of compensation values, and use a plurality of reference compensation values to fine tune the summation of compensation values, so as to generate a plurality of compensation values to be used in a next iteration. Or, after the end of the calibration operation, the compensation device 111 may compensate for the IQ imbalance on the received signal according to the summation of compensation values to generate the compensated input signal.

Figure 8:
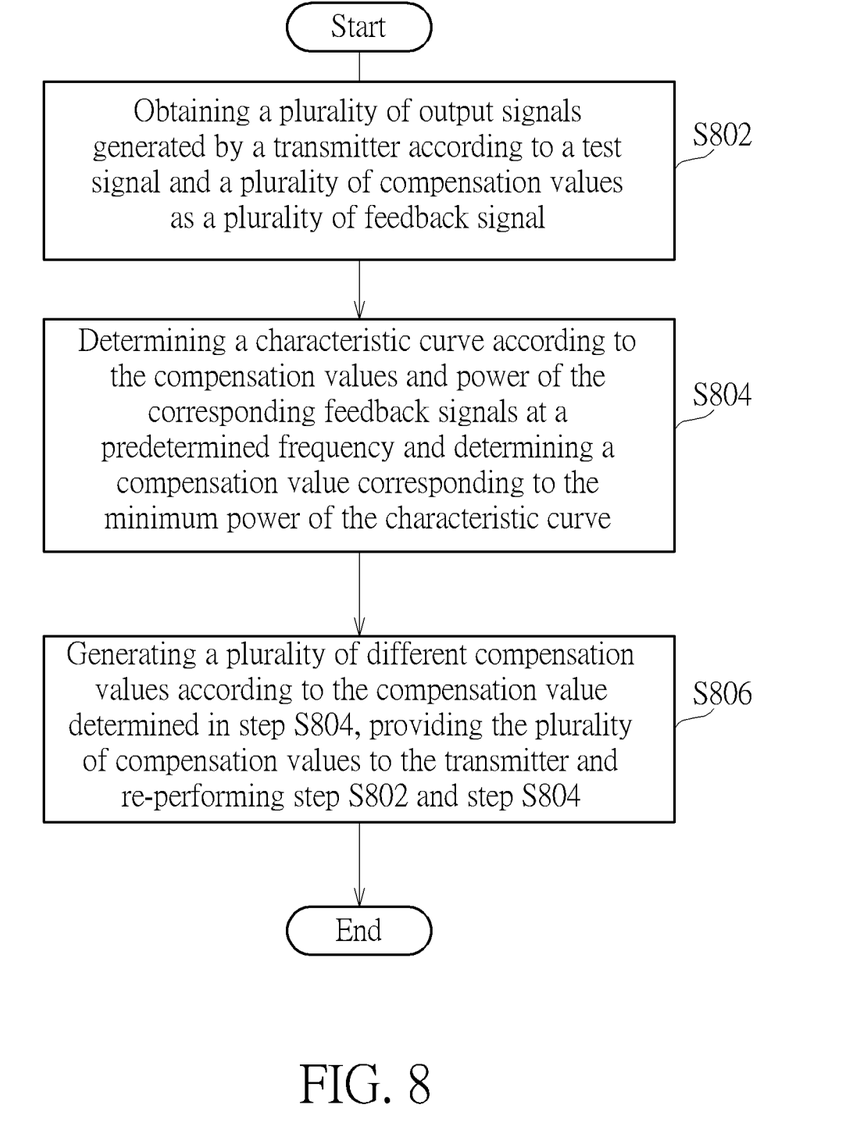
FIG. 8 shows an exemplary flow chart of a method for calibrating IQ imbalance compensation values according to an embodiment of the invention.

FIG. 8 shows an exemplary flow chart of a method for calibrating IQ imbalance compensation values according to an embodiment of the invention. The method may be performed by the compensation value calibration device and comprise the following steps:

Step S802: Obtaining a plurality of output signals generated by a transmitter according to a test signal and a plurality of compensation values as a plurality of feedback signal. The output signals are the signals generated after the test signal being processed by one or more transmitting signal processing devices on the transmitting signal processing path 110 that comprises an in-phase channel and a quadrature-phase channel.

Step S804: Determining a characteristic curve according to the compensation values and power of the corresponding feedback signals at a predetermined frequency and determining a compensation value corresponding to the minimum power of the characteristic curve according to the characteristic curve.

According to an embodiment of the invention, after performing step S804 for the first time, the digital signal processor 125 may determine whether to end the calibration operation. For example, the digital signal processor 125 may determine whether a predetermined number of iterations is achieved (that is, a predetermined number of iterations have been performed) or whether the minimum power obtained in this iteration satisfies a predetermined condition. When the digital signal processor 125 determines to end the calibration operation, the digital signal processor 125 provides the compensation value determined in step S804 to the transmitter. When the digital signal processor 125 determines that a next iteration has to be performed, step S806 may be performed.

Step S806: Generating a plurality of different compensation values according to the compensation value determined in step S804, providing the plurality of compensation values to the transmitter and re-performing step S802 and step S804. Every time when re-performing step S802, at least one of the plurality of compensation values is adjusted (that is, it will be a different value from the previous one).

According to an embodiment of the invention, step S806 may be repeatedly performed until a stop condition for ending the calibration operation is satisfied. For example, the digital signal processor 125 may end the calibration operation when determining that a predetermined number of iterations is achieved or the minimum power obtained in this iteration satisfies a predetermined condition. When the calibration operation is ended, the transmitter may compensate for the IQ imbalance according to the latest obtained compensation value in subsequent operations.

It is to be noted that in the embodiments of the invention, when performing step S806, the digital signal processor 125 may generate the plurality of compensation values by fine-tuning the compensation value determined in step S804, and when re-performing step S804, the digital signal processor 125 may determine the characteristic curve according to the plurality of compensation values obtained after the fine-tuning or according to a plurality of fine-tuning values utilized for fine-tuning the compensation value determined in step S804. When the digital signal processor 125 determines the characteristic curve according to the fine-tuning values, it means that the iterative calibration operation is to try to find out the best fine-tuning value in each iteration. Therefore, when the number of iterations that have been performed in the calibration operation is greater than one, the digital signal processor 125 may add up all the compensation values previously obtained in step S804 when performing step S806 to obtain a summation of compensation values and use a plurality of fine-tuning values to fine tune the summation of compensation values so as to generate a plurality of different compensation values to be used in a next iteration. It is to be noted that in other embodiments of the invention, it may also be the compensation device 111 that is configured to add up all the compensation values previously obtained to obtain a summation of compensation values, and use a plurality of fine-tuning values to fine tune the summation of the compensation values to generate different compensation values.

As shown in FIG. 3, FIG. 5 and FIG. 7, by applying the proposed method for calibrating IQ imbalance compensation values in the calibration operation, the energy or the power of the image signal Img may be gradually reduced in the calibration operation, and the IQ imbalance in the transmitter can be effectively eliminated by calibrating the compensation values utilized by the compensation device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter circuit, comprising:
   at least one transmitting signal processing device, configured to sequentially generate a plurality of output signals according to a plurality of input signals;
   a compensation device, configured to sequentially generate the input signals according to a plurality of initial compensation values; and
   a compensation value calibration device, coupled to an output terminal of the at least one transmitting signal processing device and configured to sequentially receive the output signals from the output terminal as a plurality of feedback signals and perform a calibration operation according to the feedback signals,
   wherein the compensation value calibration device comprises:
   a digital signal processor, coupled to the compensation device,
   wherein in the calibration operation, the digital signal processor is configured to determine a first characteristic curve according to the initial compensation values and power of the feedback signals at a predetermined frequency, determine a first compensation value corresponding to a minimum power in the first characteristic curve according to the first characteristic curve and provide the first compensation value to the compensation device.

2. The transmitter circuit as claimed in claim 1, wherein the predetermined frequency is twice an input frequency of the input signals.

3. The transmitter circuit as claimed in claim 1, wherein the first compensation value is determined in a first iteration of the calibration operation and when the digital signal processor determines that a second iteration of the calibration operation has to be performed, the digital signal processor is further configured to provide a plurality of first reference compensation values to the compensation device.

4. The transmitter circuit as claimed in claim 3, wherein after the compensation device sequentially generates the input signals according to the first compensation value and the first reference compensation values and after the at least one transmitting signal processing device sequentially generates the output signals according to the input signals, the digital signal processor is further configured to determine a second characteristic curve according to the first reference compensation values and power of the feedback signals corresponding to the output signals at the predetermined frequency, determine a second compensation value corresponding to a minimum power in the second characteristic curve according to the second characteristic curve and provide the second compensation value to the compensation device.

5. The transmitter circuit as claimed in claim 4, wherein when the second iteration of the calibration operation ends, the compensation device is configured to generates the input signals according to a summation of the first compensation value and the second compensation value.

6. The transmitter circuit as claimed in claim 1, wherein the initial compensation values and the first compensation value are amplitude compensation values or phase compensation values.

7. The transmitter circuit as claimed in claim 3, wherein the first reference compensation values are utilized to adjust the first compensation value in the second iteration.

8. A compensation value calibration device, for calibrating one or more compensation values utilized by a compensation device of a transmitter, comprising:
- a Fast Fourier Transform (FFT) device, configured to perform FFT on a plurality of feedback signals received from the transmitter, wherein the feedback signals correspond to a plurality of initial compensation values; and
- a digital signal processor, coupled to the FFT device and the compensation device and, in a calibration operation, configured to determine a first characteristic curve according to the initial compensation values and power of the feedback signals at a predetermined frequency, determine a first compensation value corresponding to a minimum power in the first characteristic curve according to the first characteristic curve and provide the first compensation value and a plurality of first reference compensation values to the compensation device,
- wherein after receiving the feedback signals corresponding to the first compensation value and the first reference compensation values from the transmitter, the digital signal processor is further configured to determine a second characteristic curve according to the first reference compensation values and power of the feedback signals at the predetermined frequency, determine a second compensation value corresponding to a minimum power in the second characteristic curve according to the second characteristic curve and provide the second compensation value to the compensation device.

9. The compensation value calibration device as claimed in claim 8, wherein the predetermined frequency is twice an input frequency of the input signals.

10. The compensation value calibration device as claimed in claim 8, wherein the initial compensation values, the first compensation value and the second compensation value are amplitude compensation values or phase compensation values.

11. The compensation value calibration device as claimed in claim 8, wherein the first reference compensation values are utilized to adjust the first compensation value.

12. A method for calibrating IQ imbalance compensation values, comprising following steps:
  (A) obtaining a plurality of output signals generated by a transmitter according to a test signal and a plurality of compensation values as a plurality of feedback signals;
  (B) determining a characteristic curve according to the compensation values and power of the feedback signals at a predetermined frequency and determining a compensation value corresponding to a minimum power according to the characteristic curve; and
  (C) generating the plurality of compensation values according to the compensation value determined in step (B), providing the plurality of compensation values to the transmitter and re-performing step (A) and step (B),
  wherein step (C) is repeatedly performed until a predetermined condition corresponding to the minimum power is satisfied.

13. The method for calibrating IQ imbalance compensation values as claimed in claim 12, wherein the predetermined frequency is twice a frequency of the test signal.

14. The method for calibrating IQ imbalance compensation values as claimed in claim 12, wherein the compensation values are utilized to compensate for an amplitude or a phase of the test signal.

15. The method for calibrating IQ imbalance compensation values as claimed in claim 12, wherein in step (C), operation of generating the plurality of compensation values according to the compensation value determined in step (B) further comprises:
  (C-1) fine-tuning the compensation value determined in step (B) to generate the plurality of compensation values,
  wherein every time when re-performing step (A), at least one of the plurality of compensation values is adjusted.

* * * * *